Oct. 2, 1923.
M. W. NEWHARD
FENDER
Filed May 15, 1920
1,469,679
2 Sheets-Sheet 1
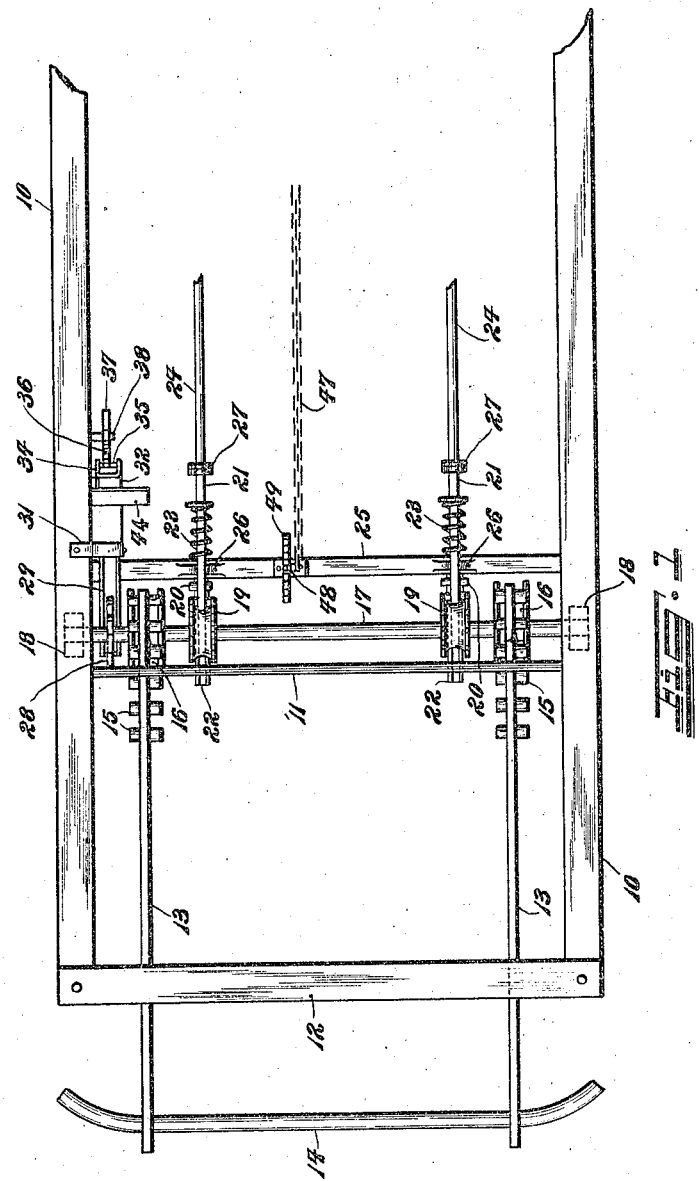
Monte W. Newhard
INVENTOR
BY Victor J. Evans
ATTORNEY.
Alfred T. Bratton
WITNESS:

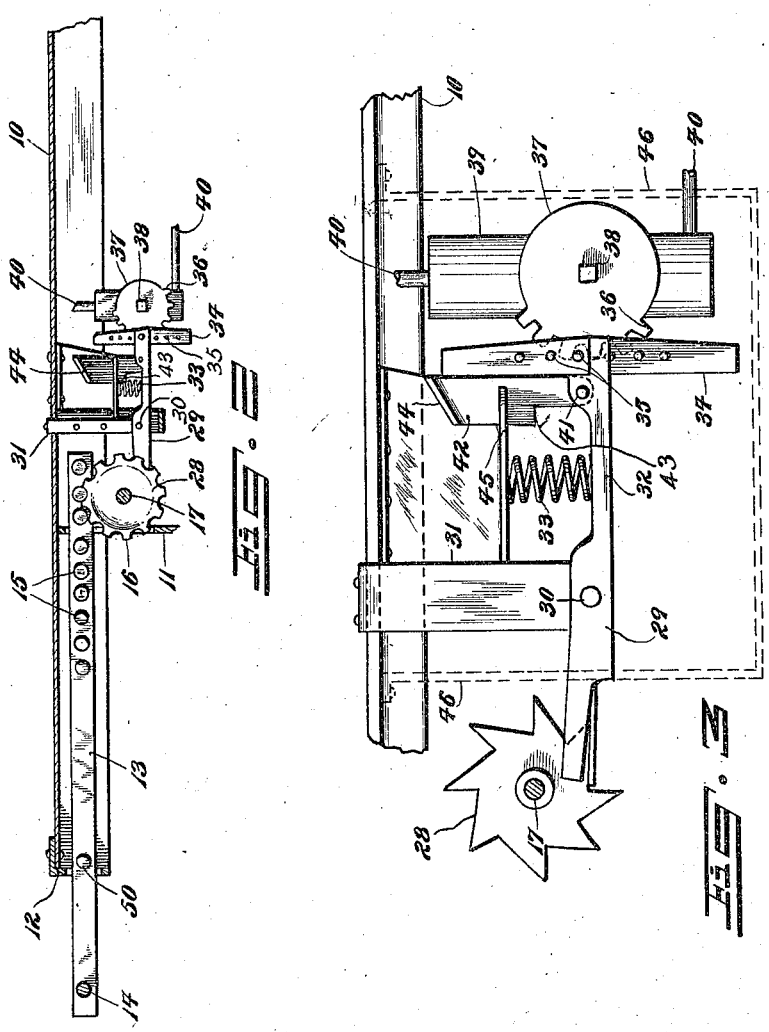

Patented Oct. 2, 1923.

1,469,679

UNITED STATES PATENT OFFICE.

MONTE W. NEWHARD, OF READING, PENNSYLVANIA, ASSIGNOR OF ONE-HALF TO ADAM BACHERT, OF READING, PENNSYLVANIA.

FENDER.

Application filed May 15, 1920. Serial No. 381,567.

*To all whom it may concern:*

Be it known that I, MONTE W. NEWHARD, a citizen of the United States, residing at Reading, in the county of Berks and State of Pennsylvania, have invented new and useful Improvements in Fenders, of which the following is a specification.

This invention relates to fenders and it has more particular reference to fenders such as are applied to self-propelled vehicles and which are adapted when meeting with an obstruction or striking an object to automatically stop the further travel of the vehicle.

The main object of this invention is to provide an improved construction of fender more particularly applicable for use on motor propelled vehicles whereby the motive power is automatically shut off in the event of an accident occurring or when said fender strikes a moving or stationary object.

Another object of this invention is to provide a fender for motor vehicles which not only automatically shuts off the motive power but simultaneously applies the brakes.

With the foregoing and other objects in view as will later on be more apparent this invention consists essentially in certain novel features of construction, combinations and arrangements of parts hereinafter more particularly described and then specifically defined by the appended claims.

In the further disclosure of the invention reference is to be had to the accompanying sheets of explanatory drawings constituting a part of this specification, and in which like characters of reference designate the same or corresponding parts in all the views.

Figure 1—is a fragmentary plan view of part of an automobile chassis with the improved fender applied thereto.

Figure 2—is a sectional elevation of the same; and

Figure 3—is an enlarged detail elevation of the means for shutting off the gas or source of power when the fender strikes an object or is rearwardly projected.

Referring to the drawings the numeral 10 designates a fragmentary portion of the chassis or underframe of an automobile or motor vehicle and transversely thereof I secure a bar or beam 11, which in conjunction with the forward end 12 of the chassis serves as a guide for longitudinally disposed spaced bars or rods 13 constituting the side members of a fender frame through and to which the fender 14 is securely attached. These bars or rods 13 are provided with laterally projecting teeth or pintles 15 engaging in correspondingly toothed sheaves or wheels 16 keyed or otherwise rigidly secured on a cross shaft 17 journaled in appropriate bearings 18 provided for the purpose on the chassis side beams. Similarly mounted on the shaft 17 are correspondingly shaped toothed and grooved wheels 19 with which engage the teeth 20 laterally projecting from longitudinally disposed bars 21 guided in shoes 22, said bars 21 being under the action of compression springs 23 and having the emergency brake rods 24 connected thereto or integral therewith. It is also to be noted that the shoes 22 are integral with or attached to a hanger or cross bearing 25 having upstanding parts 26 between which and adjustable collars 27 are disposed the springs 23 and thus it will be easily seen that by said arrangement of parts a simple and effective means is provided for adjusting the brakes as well as compensating for any lost spring pressure due to wear and tear. Furthermore I would here point out that the teeth 15 on the fender bars 13 are disposed to operate on the upper parts of the wheels 16, whilst the teeth 20 on the bars 21 are arranged under the wheels 19 and from which it will be clearly understood that when the fender 14 strikes an obstruction and is rearwardly moved, the wheels 16, 19, will be turned in a clockwise direction and thereby draw the bars 21 and brake rods 24 forwardly in opposition to the springs 23 thus applying the brakes to the automobile automatically. The wheels 16, 19, are also preferably made in the manner set forth so that any dirt or grease tending to accumulate thereon will be easily worked out and readily fall away whilst at the same time should a tooth or teeth on either side of a wheel be broken or become damaged, no impediment will arise to interfere with the smooth working of the device inasmuch as the teeth on the opposite side of the wheel will continue to remain in mesh with the teeth 15, 20, on the bars 13, 21, respectively.

Keyed or otherwise securely mounted on the aforesaid shaft 17 is a ratchet wheel 28 with which engages the forward end of a lever 29 pivoted at 30 on a depending bracket 31 and having a laterally and rearwardly extending arm 32 under the action of an expansion spring 33, serving to maintain said lever 29 always in engagemnt with the teeth of the ratchet wheel 28. Integral with or rigidly secured on the rear end of the lever 29 is a rack member 34 provided with pin teeth 35 that engage the teeth 36 of a sector or disk 37 mounted on the stem 38 of a safety cock or valve 39 located in the fuel supply pipe or gas line 40. Pivoted at 41 on the aforesaid lever extension 32 is an arm or link 42 having a notched out or cut away part 43 and a laterally projecting finger or handle 44 whereby said arm or link 42 can be lifted and moved forwardly so that the notched out portion 43 is engaged by and rests on the adjacent end 45 of the bracket 31, in which position the cock or valve 39 is closed and the fuel or gas supply cut off. A casing or box 46 indicated by the dotted lines in Figure 3 is preferably arranged to close in the parts shown and provided with an appropriate secret lock and key so that when the vehicle or machine on which my invention is installed is left unattended the arm or link 42 can be raised to locking position, the box 46 closed and locked, and thus constitute a safeguard against theft or unauthorized removal of said vehicle or machine.

From the foregoing description it will be readily seen that by my invention there is provided a very effective means associated with the fender for stopping a moving self propelled vehicle by automatically shutting off the fuel supply and simultaneously applying the service brake or brakes and in this connection I wish to point out that I preferably substitute a flexible connection 47 from the emergency brake lever 48 to said emergency brake so that when the fender strikes an object the service brakes are automatically applied. Stops 50 limit the forward movement of the fender 14 and it will be obvious that when said fender has been rearwardly moved by an impact, it is either drawn forward again manually or so moved by the springs if the arm or link 42 has been lifted.

Whilst I have illustrated and described one practical embodiment of the invention it is to be clearly understood that changes and modifications therein may be readily effected to meet different service conditions without departing from the spirit and scope thereof, and that I desire to avail myself of such variations and modifications as fairly come within the scope of the appended claims.

Having described my invention, what I claim as new and desire to secure by Letters Patent, is:—

1. The combination with a motor driven vehicle having brake mechanism and a fuel supply connection, of a rearwardly movable spring influenced fender, a rotatable shaft journaled transversely of the vehicle underframe, toothed wheels on the shaft and having operative connection with the fender and adapted to be moved in a clockwise direction thereby, other toothed wheels on said shaft having operative connection with forwardly movable rack bars connected to the service brakes, a ratchet wheel on said shaft, a spring influenced pivoted lever movable by said ratchet wheel for closing the fuel supply connection, and means for locking said fuel supply connection in closed position when the vehicle is left unattended.

2. The combination with a motor driven vehicle having brake mechanism and a fuel supply connection, of a rearwardly movable spring influenced fender, a rotatable shaft journaled transversely of the vehicle underframe, toothed wheels on the shaft and having operative connection with the fender and adapted to be moved in a clockwise direction thereby, other toothed wheels on said shaft having operative connection with forwardly movable rack bars connected to the service brake, a ratchet wheel on said shaft, a spring influenced pivoted lever movable by said ratchet wheel, a toothed rack integral with said lever, a valve in the fuel supply connection, a toothed sector on the valve stem operable by the aforesaid toothed rack, and means for locking said valve in closed position when the vehicle is left unattended.

3. The combination with a motor driven vehicle having brake mechanism and a fuel supply connection, of a rearwardly movable spring influenced fender, a rotatable shaft journaled transversely of the vehicle underframe, toothed wheels on the shaft and having operative connection with the fender and adapted to be moved in a clockwise direction thereby, other toothed wheels on said shaft having operative connection with forwardly movable rack bars connected to the service brake, a ratchet wheel on said shaft, a spring influenced pivoted lever movable by said ratchet wheel, a toothed rack integral with said lever, a valve in the fuel supply connection, a toothed sector on the valve stem and operable by the rack, and a notched out link on said lever for locking the valve in closed position when the vehicle is left unattended.

In testimony wherof I affix my signature.

MONTE W. NEWHARD.